UNITED STATES PATENT OFFICE.

HARRY B. CHALMERS, OF DEDHAM, MASSACHUSETTS.

WATERPROOF CEMENT.

1,112,890.     Specification of Letters Patent.     Patented Oct. 6, 1914.

No Drawing.     Application filed November 29, 1909. Serial No. 530,310.

*To all whom it may concern:*

Be it known that I, HARRY B. CHALMERS, a citizen of the United States, and a resident of the city of Dedham, in the county of Norfolk and State of Massachusetts, United States of America, have invented certain new and useful Improvements in Waterproof Cement, of which the following is a specification.

My invention relates to a new composition of matter which is useful for cementing, and which is especially applicable for cementing belting of leather or other material, and for many other uses where a cement which is not affected by moisture is desired.

To these ends my invention resides in the combination of chemical materials which I will describe in the following specification, and which I will set forth in the appended claims.

Nitro-cellulose dissolved in suitable solvents has been used as a water-proof cement to a considerable extent and to the great benefit of manufactures, especially to the belt-manufacturer's trade. Such compositions of matter had their restrictions and objectionable features among which is their inflammability and consequent danger in use. To overcome this objectionable feature of the aforesaid compositions of matter, and for the purpose of improving upon compositions of this character, I have invented the water-proof cement and the process of manufacturing said cement which I will now proceed to describe.

Instead of nitrating the cellulose I first treat it with acetic acid to form an acetate of cellulose. Or, if desired, the tetra-acetate of cellulose may be used. The latter material is perhaps more available, but the maker of the cement is more limited as to solvents than he is with the acetate. Acetone or chloroform are satisfactory solvents and these may be mixed with fusel-oil, acetic acid, amyl acetate, nitrobenzol, or other chemical for purposes of lessening the cost of manufacture, or for retarding the drying qualities of the finished product. Its durability is also enhanced by the use of a softening agent, such, for example, as a relatively small quantity of castor-oil, carbolic acid, creosote, naphthalin, camphor, or non-volatile ester of the fatty or aromatic acids. Any of these may be used by themselves for this purpose, or two or more of them may be used together if so desired.

Many variations of the above chemical materials may be used without departing from the principles of this invention, to produce a composition with the desired characteristics and qualities. Merely as a concrete example of one exemplification of this invention, the following ingredients and proportions are set forth. Tetra-acetate of cellulose, one pound, dissolved in a mixture of one half of a gallon of chloroform and one half of a gallon of acetone, to which has been added one per cent. castor-oil and one per cent. carbolic acid by weight.

The composition of matter herein described is especially made for the purpose of a water-proof cement for belting and other articles, but I do not, of course, mean to limit myself to this specific use, as it is obviously applicable for other uses such as that of coating leather or textiles, or for coating wires for insulating purposes.

What I claim is:—

1. A cement comprising tetra-acetate of cellulose dissolved in a mixture of chloroform and acetone, and a small percentage of castor oil and carbolic acid.

2. A cement comprising tetra-acetate of cellulose, one pound, dissolved in a mixture of one half of a gallon of chloroform and one half of a gallon of acetone, said mixture containing by weight one per cent. castor oil and one per cent. carbolic acid.

In testimony whereof I have signed my name to this specification in the presence of two subscribing witnesses.

HARRY B. CHALMERS

Witnesses:
    GORDON STEWART,
    OSWALD HORNSBY.